US000001917H

United States Statutory Invention Registration [19]

[11] Reg. Number: H1,917

Browning et al.

[45] Published: Nov. 7, 2000

[54] SIGNAL-PROCESSING MODULE FOR A TELECOMMUNICATIONS SWITCHING PLATFORM

[75] Inventors: Mark David Browning, Bartlett; James M. Davis, Germantown; Cecil W. Johnson, Jr.; Scott Arthur Kooy, both of Memphis; H. John Lohn, III, Collierville; R. Timothy Wallace, Bartlett, all of Tenn.

[73] Assignee: DSC/Celcore, Inc., Plano, Tex.

[21] Appl. No.: 09/026,488

[22] Filed: Feb. 19, 1998

Related U.S. Application Data

[60] Provisional application No. 60/060,107, Sep. 26, 1997.

[51] Int. Cl.[7] ..... H04J 3/16

[52] U.S. Cl. ..... 370/465

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "Hybrid MicroSystems: The Ultimate Flexibility in Cellular Applications", 1996, p. 1–16, Celcore, Inc., Memphis, Tennessee.

"GlobalHub Mobility Manager—Enables "One Number" PCS Service Via Motorola PPS Residential Products" p. 1–2, Celcore, Inc., Memphis, Tennessee, 1996.

"IS–41 Network Hub—The Mobility Manager for Celcore's GlobalSystem" p. 1–2, Celcore, Inc., Memphis, Tennessee, 1996.

"GlobalHub" p. 1–10, Celcore, Inc., Memphis, Tennessee, 1996.

John Scourias, "Overview of the Global System for Mobile Communications", Mar. 27, 1996, p. 1–16, John Scourias.

Martin A. Iroff & Steve Chen, "A distributed GSM Architecture for Low–Traffic Density Markets", *Mobile Communications International*, Oct. 1996, p. 1–3, IBC Business Publishing, London, England.

(List continued on next page.)

*Primary Examiner*—Daniel T. Pihulic
*Attorney, Agent, or Firm*—John G. Flaim

[57] ABSTRACT

Described is a system and method for transcoding and rate-adapting between information channels having a first rate and signal-encoding scheme and information channels having a second rate and second signal-encoding scheme. Further described is a system and method for determining when a signal-processing module has failed or been removed or inserted into an operating telecommunications switching platform. Also described is a system and method for efficient power-up, to allow for more efficient system power-up, the signal-processing modules of the present invention preferably have their operating systems stored in a nonvolatile memory that can be reprogrammed without removing it from the system. A switching module is further capable of responding to heartbeat messages and identifying itself as operational over one bus or both buses of a redundant-pair control bus. The module also has a reprogrammable, nonvolatile memory associated with it from which the module can run its operating system. The module can also transfer the operating system into another memory, allowing it to make updates to the operating system stored in the nonvolatile memory without interrupting its execution of its run-time operating code.

46 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

Information pamphlet, Feb. 1997, p. 1–7, Version 1.0, Celcore, Inc., Memphis, Tennessee.

"BS–20/BS–21, D900/D1800 Base Transceiver Station", p. 1–2, Geschaftszweig Mobilfunknetze, Munchen, Germany, 1997.

"ICs for Communications–Memory Time Switch Large MTSL" Mar. 1995, p. 1–15, Version 2.1, Siemens AG, Munchen, Germany.

"ICs for Communication—Multipoint Switching and Conferencing Unit—Attenuation MUSAC–A" Feb. 1996, p. 1–68, Version 1.2, Siemens AG, Munchen, Germany.

"ICs for Communications—Multichannel Network Interface Controller for HDLC MUNICH32" Jan. 1996, p. 1–252, Version 3.2, Siemens AG, Munchen, Germany.

"Unique Solutions to Complex Challenges of Wireless Carriers" p. 1–9, Celcore, Inc., Memphis, Tennessee, 1997.

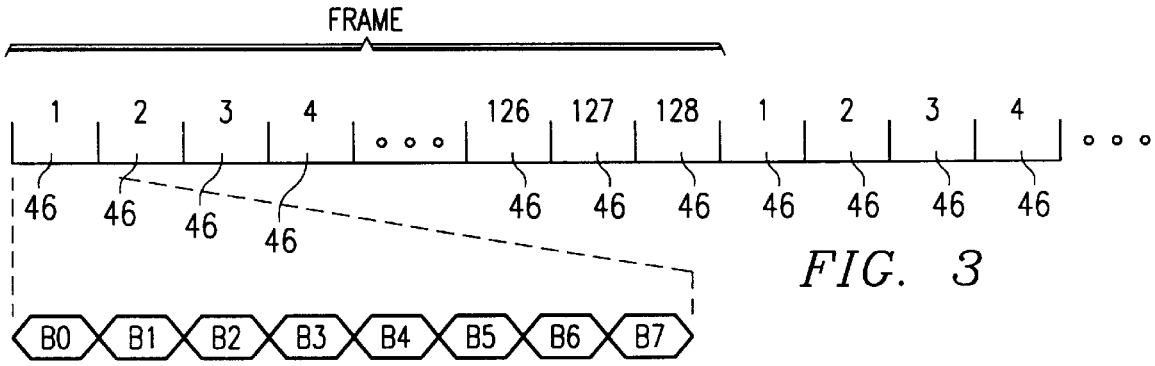
FIG. 3
FIG. 6
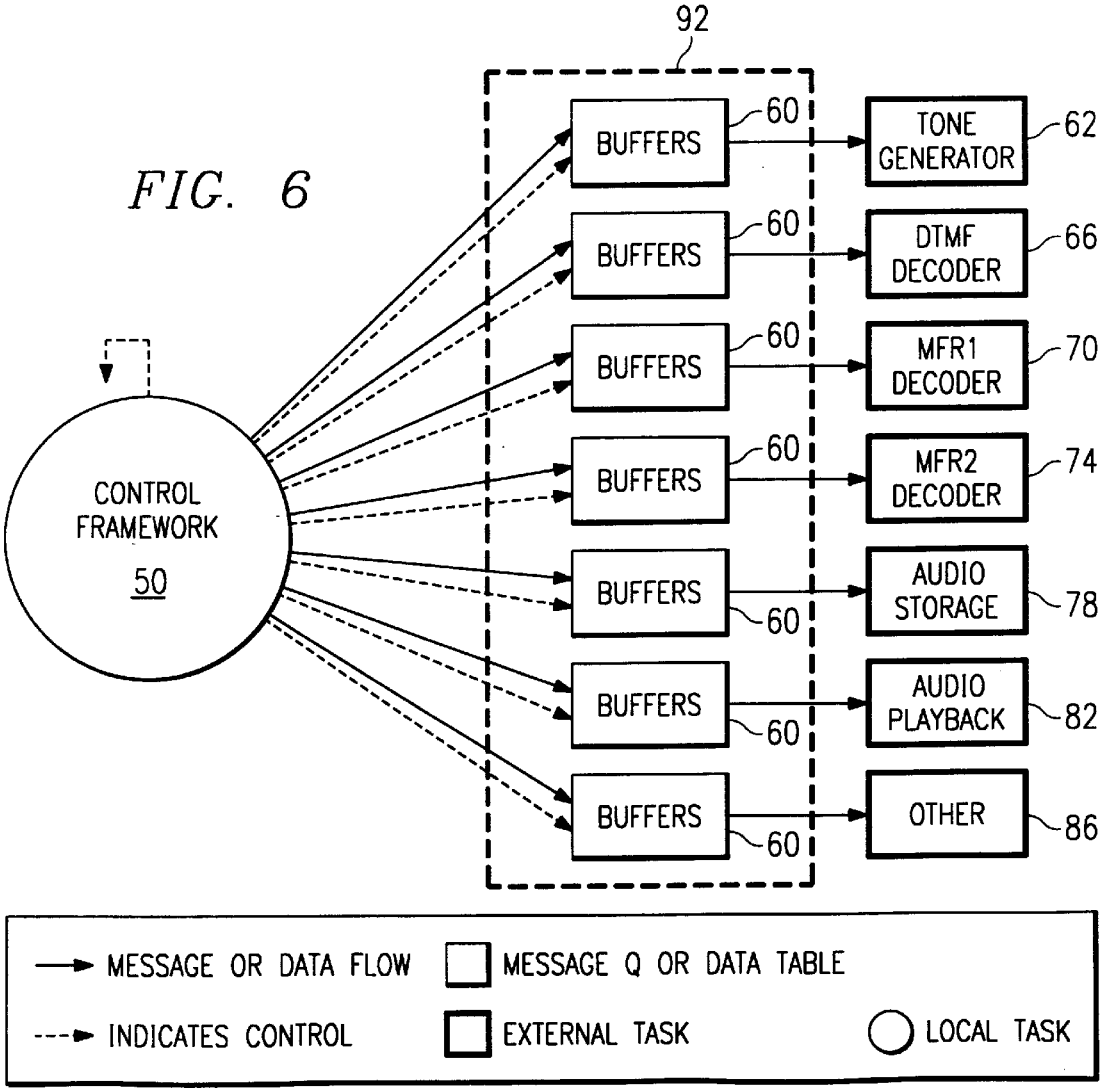

SIGNAL-PROCESSING MODULE FOR A TELECOMMUNICATIONS SWITCHING PLATFORM

CLAIM OF PRIORITY

The instant patent application claims priority from the U.S. provisional patent application designated with Ser. No. 60/060,107, entitled "Cellular Communication System," naming Anthony G. Fletcher and Scott D. Hoffpauir as inventors, and which was filed on Sep. 26, 1997.

RELATED PATENT APPLICATIONS

The instant patent application is related to the following patent applications: (a) the U.S. patent application Ser. No. 09/026,467 designated by DSC Case No. 840-00 and Attorney Docket No. 24194000.185, entitled "Fault Testing in a Telecommunications System," naming H. John Lohn III and Sarvesh Asthana as inventors, and which was filed concurrently with the instant application; (b) the U.S. patent application Ser. No. 09/026,229 designated by DSC Case No. 841-00 and Attorney Docket No. 24194000.186, entitled "System and Method for Dynamically Mapping Components Within a Telecommunications Switching Platform," naming H. John Lohn III as inventor, and which was filed concurrently with this application; (c) the U.S. patent application Ser. No. 09/025,740 designated by DSC Case No. 846-00 and Attorney Docket No. 24194000.191, entitled "Switching Module for a Telecommunications Switching Platform," naming Mark D. Browning, James M. Davis, Cecil W. Johnson, Jr., Scott A. Kooy, H. John Lohn III, and R. Timothy Wallace as inventors, and which was filed concurrently with this application; (d) the U.S. patent application Ser. No. 09/026,485 designated by DSC Case No. 847-00 and Attorney Docket No. 24194000.192, entitled "Span Interface Module for a Telecommunications Switching Platform," naming Mark D. Browning, Cecil W. Johnson, Jr., Scott A. Kooy, H. John Lohn III, and R. Timothy Wallace as inventors, and which was filed concurrently with this application; (e) the U.S. patent application Ser. No. 09/026,321 designated by DSC Case No. 849-00 and Attorney Docket No. 24194000.194, entitled "Telephony-Support Module for a Telecommunications Switching Platform," naming Mark D. Browning, Cecil W. Johnson, Jr., Scott A. Kooy, H. John Lohn III, Shawn W. Vines, and R. Timothy Wallace as inventors, and which was filed concurrently with this application; (f) the U.S. patent application Ser. No. 09/026,486 designated by DSC Case No. 851-00 and Attorney Docket No. 24194000.196, entitled "System and Method for Forming Circuit Connections within a Telecommunications Switching Platform," naming James M. Davis, Scott A. Kooy, and H. John Lohn III as inventors, and which was filed concurrently with this application.

FIELD OF THE INVENTION

This invention generally relates to telecommunications systems and more particularly to mobile and land-based telecommunications switching platforms.

BACKGROUND OF THE INVENTION

Telecommunications switching platforms operate to connect incoming communication channels to selected outgoing communication channels. Incoming information channels may be 16 kbps LPC-encoded voice channels or 64 kbps PCM-encoded voice channels. Outgoing information channels may likewise be 16 kbps LPC-encoded voice channels or 64 kbps PCM-encoded voice channels. Even when information channels are being switched from one 16 kbps LPC-encoded voice channel to another 16 kbps LPC-encoded voice channel, the telecommunications switching platform may require the internal switching of the voice channels to be performed using 64 kbps switches and channels; thus even in this circumstance rate conversion and transcoding may be required.

In the event that a module used in a prior-art telecommunications switching platform fails, or is added or removed from the system while the system is operating, prior-art systems have failed to detect such failure or insertion or extraction. Thus, such systems are unable to be easily be configured or reconfigured.

In prior-art telecommunications switching platforms a number of processors or controllers may be implemented to perform the numerous functions of the platforms. In such cases, each of the processors typically has an operating system associated with it. Prior-art systems have typically required that the operating system be downloaded into volatile memory from a high-level operating system, which might have its own associated nonvolatile semiconductor memory or hard disk drive.

SUMMARY OF THE INVENTION

The present invention overcomes the problems associated with prior-art systems by providing a system and method for transcoding and rate-adapting between information channels having a first rate and signal-encoding scheme and information channels having a second rate and second signal-encoding scheme.

The present invention further provides a system and method for determining when a signal-processing module has failed or been removed or inserted into an operating telecommunications switching platform. The present invention also provides for a system and method in which each of the signal-processing modules has a reprogrammable, nonvolatile memory associated with it that has the operating system for the signal-processing module stored in it.

A system in current operation is sometimes referred to as "hot," and thus the removal or reinsertion of one of these interface modules may be referred to herein as a "hot removal" or a "hot insertion." Signal-processing modules of the preferred embodiment have semi-permanent or "nailed-up" connections to interface modules, which in turn connect externally to telecommunication signals or spans. The telecommunications signals or spans will carry a number of information channels, which are preferably transcoded and rate adapted by the preferred-embodiment signal-processing modules.

The signal-processing modules communicate with other elements of the telecommunication switching platform through a control bus, which preferably comprises a pair of redundant control buses. Communications over the control bus is through a Local COMmunication (LCOM) protocol.

To monitor for, among other things, signal-processing module failures, "hot insertions," and "hot removals," the LCOM protocol provides for a heartbeat messaging scheme. In one embodiment, this messaging scheme provides that one group of signal-processing modules will use one of the redundant control buses as a primary bus, and that the other group of signal-processing modules will use the other of the redundant control buses as a primary bus. Whichever group of signal-processing modules uses one of these redundant buses as a primary bus will use the other of the redundant buses as a secondary bus.

An LCOM controller, within a first time period, sends a primary heartbeat message over both of the redundant control buses. The buses are individually addressed by use of an LCOM header. Supposing that one of the buses is referred to as Bus A and the other as Bus B, then there will be a "broadcast A" value placed in the LCOM header of the LCOM heartbeat message intended to be broadcast over Bus A and a "broadcast B" value placed in the LCOM header of the LCOM heartbeat message intended to be broadcast over Bus B. This process is preferably referred to herein as "primary heartbeat messaging."

The LCOM controller also preferably performs a type of heartbeat messaging known as "secondary heartbeat messaging." With the secondary heartbeat messaging, the LCOM controller preferably cycles through all known interface modules in the switching platform, by placing certain "slot IDs" in the LCOM header of each secondary heartbeat message. The LCOM controller then cycles through the known slots of the platform, making sure that each signal-processing module is also capable of communicating over its secondary bus.

To allow for more efficient system power-up, the signal-processing modules of the present invention preferably have their operating systems stored in a nonvolatile memory that can be reprogrammed without removing it from the system. For instance, the nonvolatile memory might be a Flash memory, an Electrically Erasable Programmable Read-Only Memory (EEPROM) or it might be a battery-backed Static Random Access Memory (SRAM), or it might another type of nonvolatile, reprogrammable memory. By keeping the operating system in a nonvolatile memory associated with the signal-processing module, the preferred embodiment platform eliminates the need for a time-consuming download of operating system code into a large number of volatile memories associated with the signal-processing modules in the platform. Instead, each signal-processing module powers-up ready-to-operate with its own operating code. Then, if necessary, perhaps while the platform is already up and operating, new operating system code can be downloaded and programmed into the nonvolatile memory of the signal-processing modules without interruption to the system or delay in the system power-up.

BRIEF DESCRIPTION OF THE DRAWINGS

FIG. 3 is a timing diagram illustrating the multiplexing of telecommunications channels upon the high-speed buses of FIG. 2;

FIG. 6 is a software block diagram of the control framework, communications buffering, and software resources operating on the switching module of FIG. 2;

Figure 1:
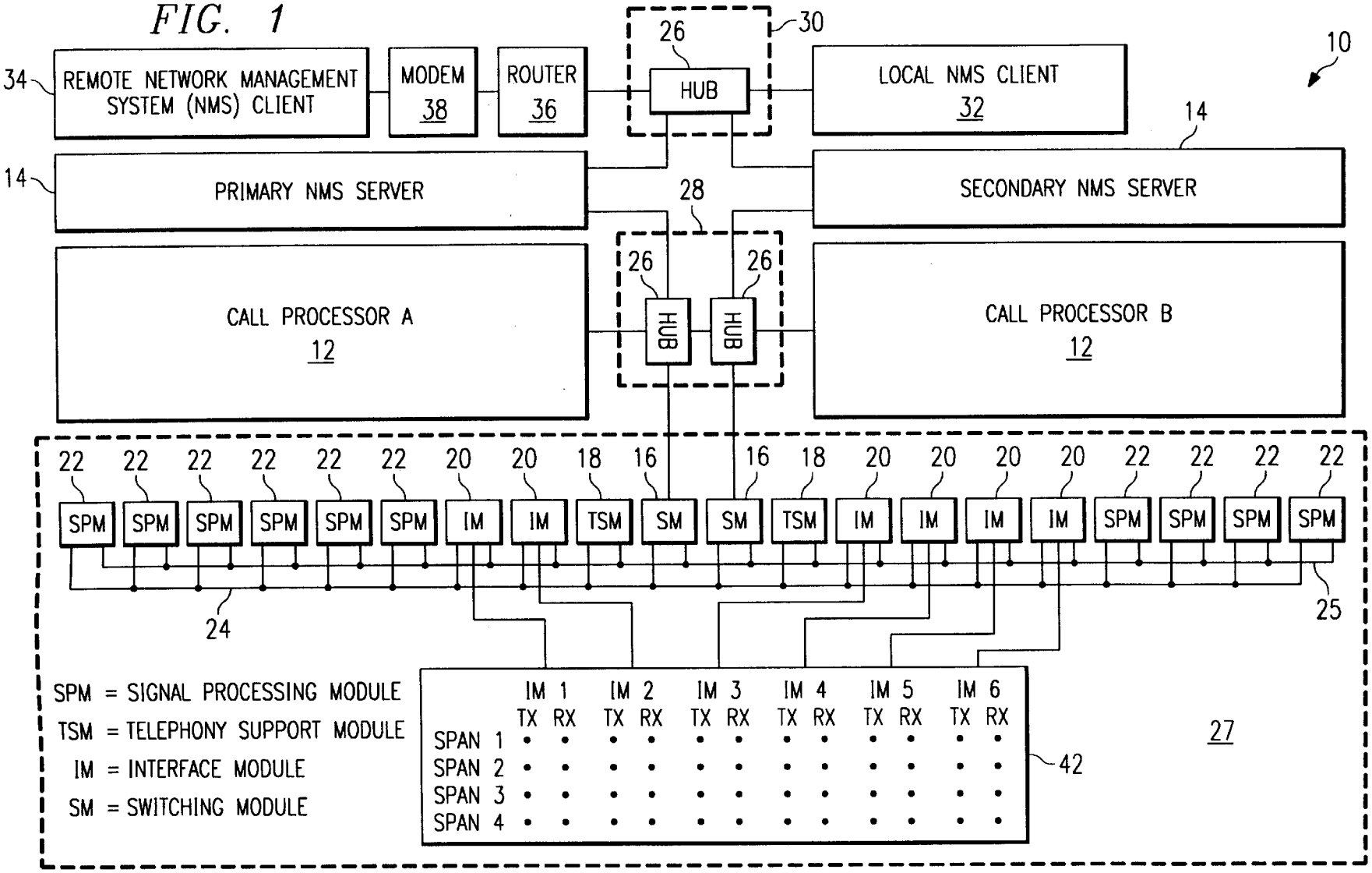
FIG. 1 is a block diagram of an embodiment of the claimed telecommunications switching platform.

All of these drawings are drawings of certain embodiments of the invention. The scope of the invention is not limited to the specific embodiments illustrated in the drawing and described below. Instead, the scope of the invention is set forth in the claims.

DETAILED DESCRIPTION OF EMBODIMENTS

FIG. 1 is a block diagram of an embodiment of the present invention. This block shows the overall telecommunications-switching platform 10. This switching platform 10 includes redundant call processors 12 and Network Management System ("NMS") servers 14 as well as switching modules 16 and resource processors 18,20,22 that carry out a number of the lower-level tasks to be accomplished by the switching platform 10. Resource processors include, for example, a telephony-support module 18, an interface module 20, and a signal-processing module 22. The resource processors are described below, and are described in further detail in U.S. patent application Ser. Nos.: 09/025,740 (Docket No. 24194000.191), entitled "Switching Module for a Telecommunications Switching Platform"; 09/024,485 (Docket No. 24194000.192), entitled "Span Interface Module for a Telecommunications Switching Platform"; 09/026,321 (Docket No. 24194000.194, entitled "Telephony-Support Module for a Telecommunications Switching Platform," all of which were filed on Feb. 19, 1998 and are hereby incorporated by reference herein.

The switching modules 16 and resource processors 18,20, 22 communicate with each other through, for example, a control bus 24. Data is passed between these same elements over high-speed data buses 25, which are preferably time-multiplexed serial data buses. The operation of these high-speed data buses 25 will be described in greater deal in FIGS. 2–3 and the text accompanying these figures.

Still referring to FIG. 1, the switching modules 16 preferably communicate with higher-level functional elements (the call processors 12, for example) within the platform 10 through communication hubs 26. In an embodiment of the present invention, logical communication paths are made between the resource processors 18,20,22 and the higher-level functional elements via the switching module 16 through, for example, TCP/IP sockets through the communication hubs 26. The higher-level functional elements are described in greater detail in U.S. patent application Ser. No. 60/060,107, entitled "Cellular Communication System," naming Anthony G. Fletcher and Scott D. Hoffpauir as inventors, filed on Sep. 26, 1997, which is hereby incorporated by reference herein.

The communication hubs 26 connect the call processors 12 to the switching modules 16 and the NMS servers 14. Preferably, there are two distinct LANs 28,30 within the call processor 12. The first LAN 28 connects the redundant call processors 12 to the redundant NMS servers 14 and redundant switching modules 16 through redundant communication hubs 26. The second LAN 30 can connect the redundant NMS servers 14 to local NMS clients 32 and/or remote NMS clients 34. Connection to remote NMS clients 34 is preferably performed through a router 36 and a modem 38. Since there is no direct NMS client access to the first LAN 28 on which the call processors 12, the switching modules 16, or the resource processors 18,20,22 operate, the NMS servers 14 may serve as "firewalls" against hacker intrusion into the switching platform 10.

With further reference to FIG. 1, the interface modules 20 connect externally to telecommunication spans 40 (see FIG. 2), which are, for example, industry-standard T1 or E1 spans each carrying a number of information channels as specified by the particular standard. These information channels may be telecommunications traffic channels or telecommunications control channels, as will be discussed below. Connection to the spans are made through span signal paths 41 from the interface modules to a span connector panel 42, which is the point at which the telecommunication spans 40 (see FIG. 2) physically connect to the switching platform 10.

Collectively, the switching modules 16, resource processors 18,20,22, control buses 24, high-speed buses 25, span signal paths 41, and span connector panel 42 are referred to as the Input/Output Sub-System ("IOSS") platform 27. In one embodiment of the present invention, the IOSS platform 27 resides on a single shelf within a telecommunications equipment rack and performs the lower-level functions within the telecommunications switching platform 10.

Control bus 24 preferably comprises a pair of redundant control buses 24, over which the various resource processors 18,20,22 communicate using, for example, a Local COMmunication (LCOM) protocol. Although high-speed data buses 25 are sometimes referred to as PCM buses, where PCM stands for Pulse Code Modulation, which is a digital voice encoding standard, the data carried on them may include control information, signaling information, data information, and voice information encoded using other standards. For example, voice information that has been encoded by a Global Standard for Mobile Communication (GSM) system are encoded using a certain type of Linear Predictive Coding (LPC).

Communication hubs 26 are preferably Ethernet Local Area Network (LAN) communication hubs, although the hubs 26 may be hubs for other local networking protocols such as, for example, Token Ring or StarLAN. The communication hubs 26 and protocols may operate using either wired or wireless connection schemes. Although the resource processors 18,20,22 preferably communicate with higher-level functional elements in the system through the switching module 16 via Transmission Control Protocol/Internet Protocol ("TCP/IP") sockets through the communication hubs 26, other networking protocols are possible. It is also possible, for example, to have such resource processors 18,20,22 directly connected to the higher-level elements in the system such that they will be directly addressed by these high-level elements using data and address buses.

"Lower-level" functions, which are described above as being performed by the IOSS platform 27 might be defined, for instance, as all functions within the Open System Interconnection ("OSI") framework as being below the Session Layer (Layer 4). Under such a division, the IOSS platform 27 would be responsible for communications routing and end-to-end delivery of information, including error recovery and flow control.

Figure 2:
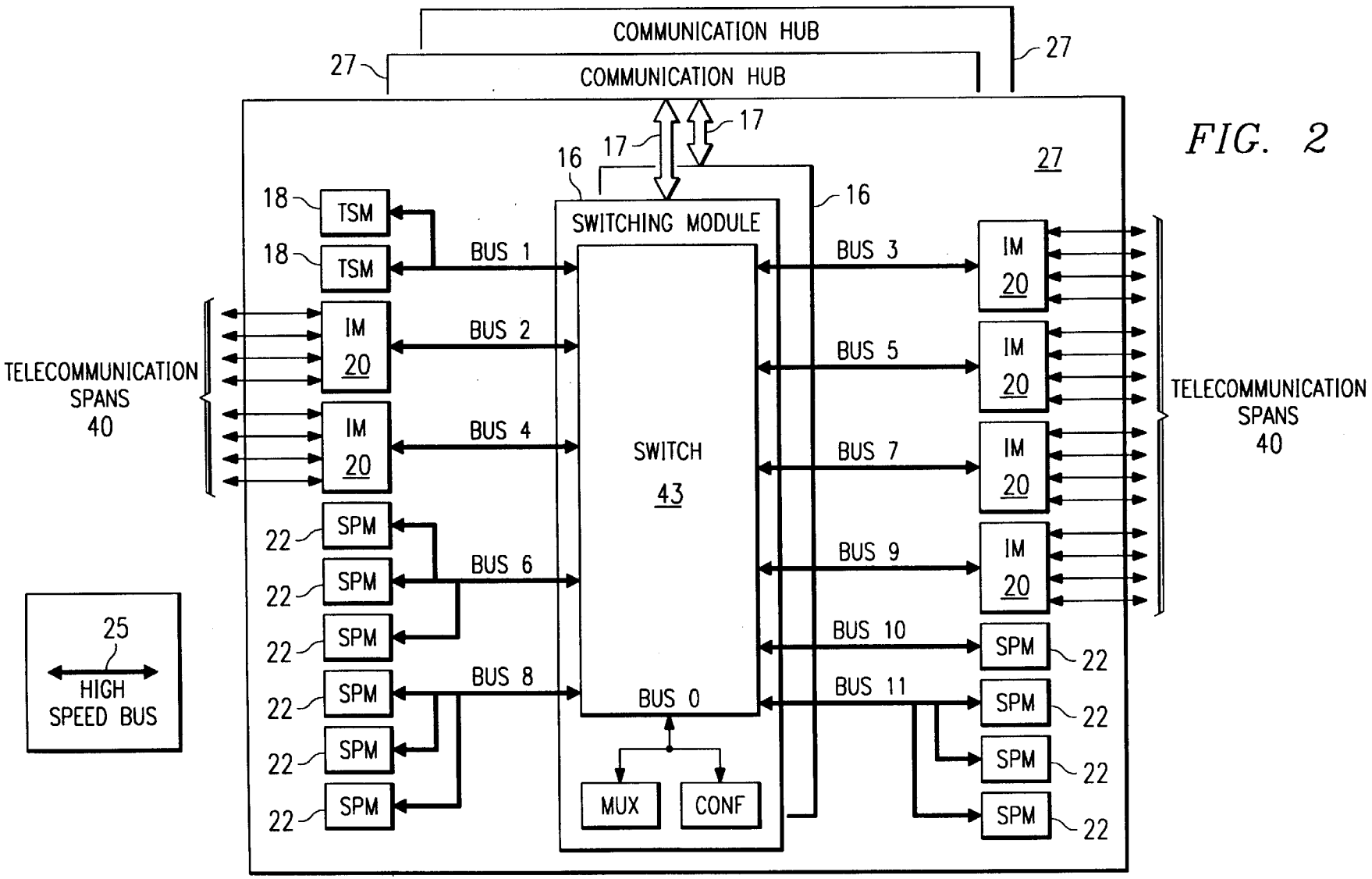
FIG. 2 is a block diagram of lower-level functional elements within the telecommunications switching platform of FIG. 1.

FIG. 2 is a block diagram of lower-level functional elements within a telecommunications switching platform 10. At the center of this block diagram are the redundant switching modules 16, which connect to the higher-level functional elements in the platform 10 through the communication hubs 26. In this embodiment, all communications between the higher-level functionality and the resource processors 18,20,22 are routed through, for example, the active, or ONLINE, switching module 16 instead of the inactive or OFFLINE one of the redundant switching modules 16.

The switching module 16 performs a number of functions. For example, one function of the switching module 16 is switching the telecommunication information channels arriving into the platform 10 through the telecommunications spans 40. As shown in FIG. 2, telecommunication spans 40 are connected to the interface modules 20. Information channels are transmitted within the spans 40 through, for example, time division multiplexing. The switching module 16 contains switches 43, which are responsible for making the connections between information channel inputs and information channel outputs according to commands from the higher-level functionality within the platform such as the call processor 12. The software function within the call processor 12 that controls switching of the information channels at the applications layer may be called the Resource Manager.

The switching platform 10 is also operable to, for example, receive from and transmit to GSM-standard mobile phones. Under the GSM standard, wireless voice channels are transmitted at 16 kbps ("kbps"), using LPC coding, whereas under many land-based telephony standards voice channels are transmitted at 64 kbps using PCM coding. Thus, in order to connect a mobile caller to a land-based called party, it is necessary to adapt the rate of the 16 kbps GSM voice channel to the land-based 64 kbps standard. This rate conversion is accomplished by, for example, a signal processing module 22.

With continued reference to FIG. 2, a GSM Base Transceiver Station (BTS) 44 (see FIG. 4) operating at full rate or enhanced full rate (16 kbps) may transmit up to four GSM voice channels on a 64 kbps DS0 information channel. A GSM BTS 44 operating at half rate (8 kbps) may transmit up to eight GSM voice channels on a 64 kbps DS0 information channel. The telecommunications switching platform 10 connects the 64 kbps DS0 channel from the BTS 44 to a signal-processing module 22 so that the signal-processing module 22 can convert this DS0 information channel into four discrete 64 kbps PCM-encoded channels. These four 64 kbps information channels are then switched to four different information channels. The final switching of four channels to four different channels will accomplish the end-to-end switching, or will connect one or more of the GSM voice channels to one of the telephony support functions (such as dial tones or tone generation or tone decoding).

Since voice connections are bi-directional or full-duplex, the connection process described above is carried out in the reverse order to receive signals from the land-based information channels. For example, the switching module 16 connects one 64 kbps DSO channel to the signal-processing module 22, then connects up to four 64 kbps channels outputs from the signal-processing module 22 to up to four different 64 kbps information channels, and these connections are duplicated in the reverse direction, for a maximum of 10 switch connections in this example.

Still referring to FIG. 2, connection is made between the information channels and the resource processors 18,20,22 and the switching modules 16 through a series of high-speed buses 25. As shown in FIG. 2, there are a total of 12 such buses used in this embodiment. For future capacity expansion, spare high-speed buses 25 may be included within the telecommunications rack and switch 43 may be configured to switch information channels on these additional buses. This embodiment includes four such spares, for a total of 16 high-speed buses. Each of these buses 25 operate at an exemplary data rate of 8.192 megabits per second ("Mbps"), which gives each bus 25 a capacity for 4 E1 spans, each E1 span having a bit rate of 2.044 Mbps. Each of these buses 25 is logically subdivided into 128 timeslots 46 (see FIG. 3). Each of these 128 timeslots 46 may be, for example, a 64 kbps channel. To share each of these buses between the various resources within the telecommunications switching platform 10, each resource or incoming information channel is assigned a certain position or timeslot within the buses 25 to which they are attached. The present invention, as set forth in certain of the claims hereinbelow, includes a novel method for assigning, maintaining, and utilizing the assignment of these timeslots 46 (see FIG. 3) to the various resources and information channels within the platform 10.

The switching module 16 uses a switch 43 to make connections between a timeslot 46 on one bus 25 to a different timeslot 46 on that same bus 25 or another bus 25. In an embodiment of the present invention, the switching module 16 is capable of connecting any of 2048 inputs to 2048 outputs. All of these connections can preferably be maintained simultaneously. The resources used within the switching platform 10 may be dynamically assigned based on system needs. As mentioned, the interface modules 20 form the entry and exit points for telecommunications spans 40 that are connected to the switching platform 10. Each of these interface modules 20 is capable of handling, for example, four E1 spans 40. Each E1 span may be comprised of 32 channels including 30 voice channels transmitted at 64 kbps, one 64 kbps framing channel, and one 64 kbps signaling channel. There are a total of six interface modules 20 shown in FIG. 2, each of which is preferably capable of handling four spans 40.

The switch 43 is preferably a Time-Space-Time switch, which is a space switch (i.e., a matrix switch) interposed between two time switches.

FIG. 3 shows how telecommunications channels may be multiplexed onto a single high-speed bus 25. In this embodiment, 128 traffic and/or information channels are multiplexed together to form a single frame that repeats every 125 $\mu$s. Each of the timeslots 46, which are numbered 1 through 128 in FIG. 3 and begin repeating again after 128 timeslots, preferably comprises a group of eight contiguous bits occurring every 125 $\mu$s. These repeating groups of bits are designated in the exemplary timeslot 1 (as shown by the break-out figure for that timeslot) as B1 through B7.

Figure 4:
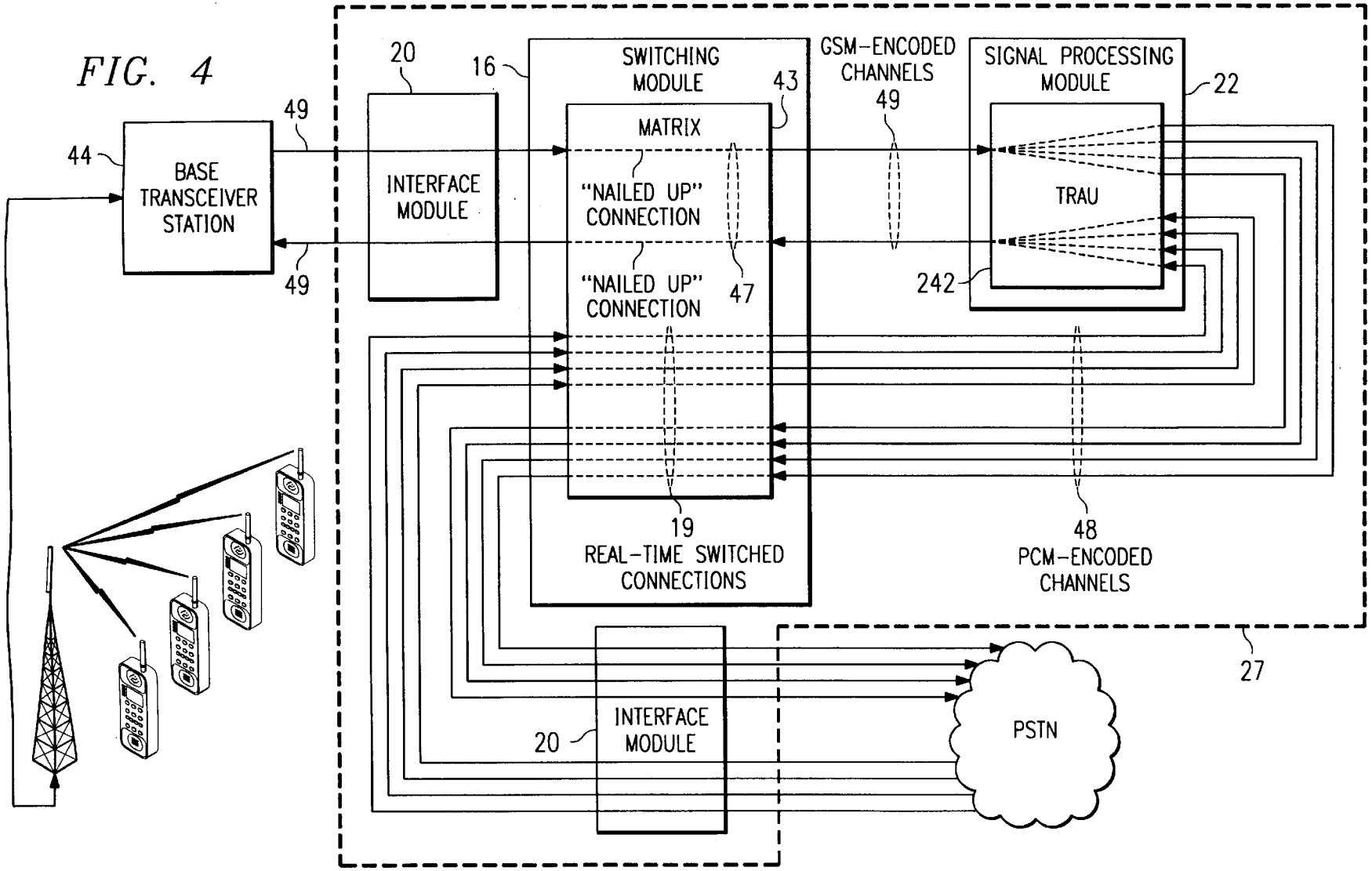
FIG. 4 is a system-level block diagram illustrating how connections may be formed through the telecommunications switching platform of FIG. 1.

FIG. 4 illustrates how connections may be formed through a telecommunications switching platform 10. In this embodiment, four GSM mobile phones are shown in wireless communication with a BTS 44. By the time the GSM-encoded voice signals are transmitted from the BTS 44 to the switch platform 10, they form a 64 kbps DSO information channel 49, which would preferably be transmitted within a telecommunications span 40 as discussed above. The span 40 is then received by the interface module 20 and is passed from there to the switching module 16. Because there is no reason to change the assignment of this GSM-encoded information channel 49 into the switching module 16, and because the GSM-encoded information channels 49 will preferably always have to be rate-adapted by the signal-processing module 22, it is advantageous to semi-permanently connect and assign the information channel to the signal-processing module 22. This semi-permanent connection is referred to as an "nailed-up" connection 47. In accordance with this designation, the addressing information required to maintain this connection through the switch 43 is stored in a configuration table within the switching module 16. The addressing information is maintained there until the system is reconfigured or until an error occurs such as a component failure or a board is removed—which would require the connections to be reconfigured.

Still referring to FIG. 4, within the signal-processing module 22, a DSO channel comprising four 16 kbps GSM voice channels is expanded into four PCM-encoded information channels 48. This expansion is shown within the Transcoder Rate Adaptation Unit ("TRAU") functional block of the signal-processing module 22. These four PCM-encoded voice channels are then passed again back through the switching module 16. Since these various voice channels are switched in real time so that the GSM telephone users can make and receive phone calls to different individuals, the switching module 16 makes real-time switching assignments or connections 19 for these PCM-encoded voice channels 48. Thus, the switching module 16 dynamically updates the connection information describing how the circuits will be switched through the switch 43. In this example, the four PCM-encoded voice channels 48 are all passed through the same or a different interface module 20 and are then transmitted to the Public Switched Telephone Network (PSTN) or Integrated Services Digital Network (ISDN) or another communications network.

A GSM caller may also call another GSM mobile telephone also connected to the same telecommunications switching platform 10. In that circumstance, one of the PCM-encoded voice channels 48 would be re-routed through the switch 43 to another channel of a signal-processing module 22 to be rate-adapted back to a 16 kbps GSM-encoded information channel 49 and then passed again through the switching module 16 and through the original or another interface module 20 to the same or another BTS 44.

Figure 5:
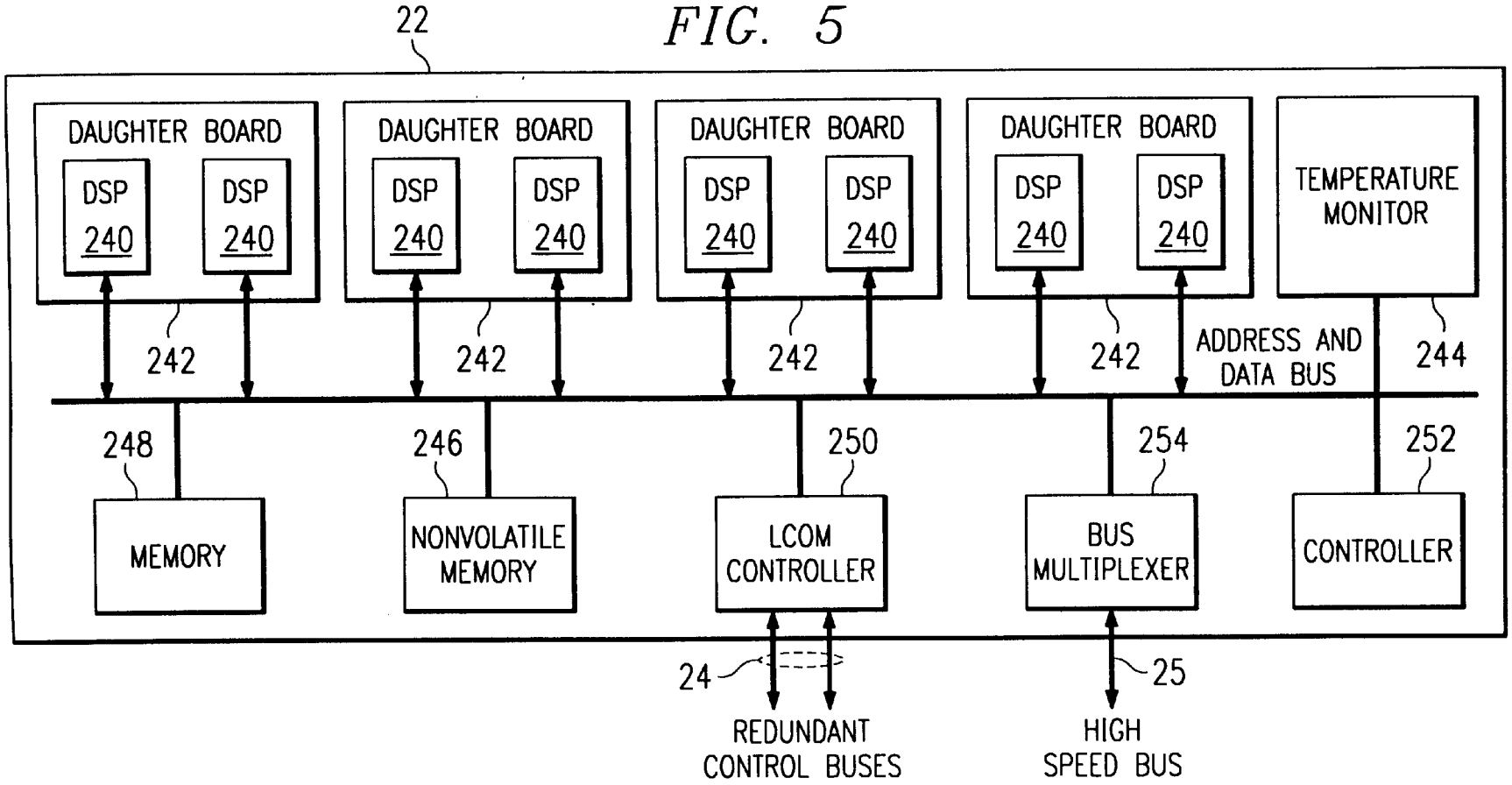
FIG. 5 is a block diagram of the signal-processing module of FIGS. 1–2.

With reference now to FIG. 5, a block diagram of an embodiment of the signal-processing module 22 is shown. The signal-processing module 22 is designed for rate-adapting the 16 Kbps GSM-encoded information channels 49 to and from the 64 Kbps PCM-encoded information channels 48 (see FIG. 4). This function is carried out, for example, by digital signal processors ("DSPs") 240. To allow flexible provisioning in this embodiment, the DSPs 240 are housed on daughter-boards 242. Up to four daughter-boards may be installed on the main module, although fewer daughter boards can be used if a full complement of daughter boards 242 is not required. In this embodiment, the daughter-boards 242 are configured to hold at least two DSPs each. Assuming, for example, that each DSP can process four GSM-encoded voice channels 49, the signal-processing module 22 thus provides up to 32 GSM ports in eight-port increments.

The bus multiplexer 254 in the signal-processing module 22 is responsible for connecting, under control of the controller 252, information channels from the PCM high-speed bus 25 to the DSP 240 signal processing resources. In addition to performing a rate adaptation, the DSPs 240 can be called upon to perform echo canceling when that function is required, particularly when the switching platform 10 is handling GSM-encoded voice channels 49. The novel integrated rate adaptation and echo cancellation functions used in the preferred embodiment telecommunications switching platform 10 are described in greater detail in U.S. patent application Ser. No. 09/026,229 (Docket No. 24194000.186), entitled, "System and Method for Dynamically Mapping Components Within a Telecommunications Switching Platform," filed on Feb. 19, 1998, which is hereby incorporated by reference herein. For maximum timeslot flexibility, in a preferred embodiment, two 32-timeslot highways are available to each daughter-board 240. Thus, a fully populated signal-processing module 22 would occupy slightly less than one third of a 128 channel, 8.192 Mbps high-speed data bus 25. Accordingly, as shown in FIG. 2, each signal-processing module 22 can share its high-speed data bus 25 with two other signal-processing modules 22.

With further reference to FIG. 5, the controller 252 manages the functions provided by the signal-processing module 22. There is also a memory 248 for data and real-time executable code storage and a nonvolatile memory 246 for storage of, for example, the signal-processing module's boot code or other nonvolatile code.

The controller 252 initiates a heartbeat message to each DSP 240 once per second. If the DSP 240 is operating as expected, it will answer the controller processor with a heartbeat response. If more than one consecutive heartbeat is not responded to within the one second window, then the DSP 240 is deemed to be in a non-operational state and the switching module 16 is notified so that dynamic remapping of a new DSP 240 can be made to take over signal processing tasks that were being accomplished by the non-responsive DSP 240. After attempting to remap the calls on the non-responsive DSP 240, the non-responsive DSP 240 is reset and reloaded with code from nonvolatile memory 246 so that it may be returned to service. The DSP 240 is preferably returned to service after multiple heartbeats are successfully exchanged between the DSP 240 and the controller 252. This return to service is preferably effected by notifying the switching module 16, thereby making the DSP's LCI available for assignment of signal processing tasks such as rate adaption and transcoding of new calls.

To allow for more efficient system power-up, the signal-processing modules 22 of the present invention preferably have their operating systems stored in nonvolatile memory 246, which can be reprogrammed without removing it from the system. For instance, the nonvolatile memory 246 might be a Flash memory, or an Electrically Erasable Programmable Read-Only Memory (EEPROM) or it might be a battery-backed Static Random Access Memory (SPAM), or it might another type of nonvolatile, reprogrammable memory. By keeping the operating system in a nonvolatile memory 246 associated with the signal-processing module 22, the preferred embodiment platform 10 eliminates the need for a time-consuming download of operating system code into a large number of volatile memories 246 associated with the signal-processing modules 22 in the platform 10. Instead, each controller 252 powers-up ready-to-operate with its own operating code. Then, if necessary, perhaps while the platform is already up and operating, new operating system code can be downloaded and programmed into the nonvolatile memories 246 of the signal-processing modules 22 without interruption to the system or delay in the system power-up.

The download of the operating code from the high-level elements in the system preferably comprises the access of a hard disk drive connected to the call processors 12. Within the hard drive is stored a number of files containing the operating code for various processors on the switching modules 16 and resource processors 18,20,22 in the telecommunication switching platform 10. For example, a number of files might be assigned as follows according to the particular module in the switching platform and the resources operating on the modules:

| | | Module Names | | | |
|---|---|---|---|---|---|
| | | SDM | PSM | SPM | QSM |
| P | Boot Code | X | X | X | X |
| r | Operating Code | X | X | X | X |
| o | FPGA Code | X | X | X | X |

-continued

| | | Module Names | | | |
|---|---|---|---|---|---|
| | | SDM | PSM | SPM | QSM |
| c | R2 Signaling Code | | X | | X |
| e | Voice Message | | X | | |
| s | Code | | | | |
| s | DSP Code | | X | X | |

Thus, for each cell in the above table that is marked with an "X", the call processor 12 and its associated hard drive (or other storage device) preferably will maintain a file containing operating code for the indicated process. If a resource processor wakes up already having valid operating code stored in it, the resource processor will begin operating from that code. If, on the other hand, a resource processor does not contain valid operating code on start-up, it will have to wait until at least some of these files are downloaded to it before it can begin operating. Also, when file updates are made to these operating code files, the Resource Manager level of the call processor can request that these file updates be made to the various resource processors 18,20,22 and switching modules 16.

The download of each of the files will preferably have a particular format that will identify the type of file that is being downloaded. Particularly, the file will have a file signature that identifies the generation of switching platform on which the file is to reside, the particular module, and the type of code within the particular module. The format of the file will preferably be as follows:

| FILE HEADER - 32 BYTES | | | | FILE | END-OF-FILE & CRC |
|---|---|---|---|---|---|
| JUMP | FILE SIG-NATURE | VERSION | LENGTH | FILE | EOF + CRC |

In the above file format, the first two bytes are preferably a JUMP code, which are preferably used only for the controller in the resource processor. Files not intended for the controller might include a false jump code such as, for example, "00."0 The "EOF" code is optional and preferably not needed in the file format, since there is a "LENGTH" field.

The flexible use of the volatile/nonvolatile memory arrangement described above allows the telecommunication switching platform 10 to download different operating code for the DSPs to enable them to perform different types of encoding. For example, the DSPs 58 may be configured to perform full-rate encoding at 16 kbps, or may perform half-rate encoding at 8 kbps, or may perform enhanced full-rate encoding at 16 kbps, one version of which is described in the PCS-1900 standard. This gives the system significant flexibility in configuration for the often-unique encoding schemes used in countries throughout the world.

The signal-processing module 22 further includes a local communications (LCOM) controller 56 that is operable to communicate with the other resource processors 18,20,22, and particularly with the switching module 16 through the redundant control buses 24.

Still referring to FIG. 5, the high-speed bus 25 comprises 128 transmit timeslots and 128 receive timeslots; as each of these timeslots is preferably a 64 kbps information channel, the high-speed bus 25 is preferably an 8.192 Mbps Time-Division-Multiplexed (TDM) bus. Preferably, the high-speed bus 25 shown in FIG. 5 is shared among three signal-processing modules 22.

The controller 50 effects communication with the switching module 16 through the LCOM controller 56. A unique protocol has been adapted for communications among the switching module 16 and the resource processors 18,20,22 over the control bus 24. The LCOM protocol has driver software that is compiled to run on the controller for the switching module 16, as well as the controllers for the resource processors 18,20,22. The LCOM protocol also has an applications layer or applications software, which operates at the higher level above the driver software.

Preferably, the LCOM driver code is cross compiled to the controllers for the resource processors 18,20,22 and the switching module 16. The LCOM driver is capable of managing the redundant control buses 24, which are preferably two ESCC2 synchronous serial buses operating at approximately 256 kbps each. The LCOM driver comprises an interrupt service routine and receive and transmit queues.

The driver transmits and receives one message per frame. In one embodiment, the message has the following format:

| LCOM_HEADER - 4 BYTES | | | |
|---|---|---|---|
| PROCESSOR ID | PROCESS ID | LENGTH | MSG |
| UINT1 | UINT1 | UINT2 | any type |

The first four bytes of the message is the LCOM_HEADER, which is available only to the LCOM software.

On the switching modules 16 and resource processors 18,20,22, there are preferably two transmit queues, one for each transmit bus 24. A message is placed in a transmit queue with a LcomSendMessage call 122. LcomSendMessage 122 has the following format:

UINT1 LcomSendMessage (UINT1 processor_id, UINT1 process id,
UINT2 length, void FAR *msg).

The "processor_id" field is the slot id of the desired destination board. The slot id is simply the slot in which the desired destination board is located. There are two exceptions to using the slot id: BID_SDM is used in place of the slot id to send to the switching module 16; BID_PSM is used in place of the slot id to send to the on-line telephony-support module 18.

The "process_id" field preferably identifies either a task on the switching module 16, such as the tasks 112, 116, 120, 124, 128, 132, 136, 140 or a pseudo-task on the resource processors 18,20,22.

The "length" field is the length of the raw message. This length does not include the length of the LCOM_HEADER, which is preferably four bytes.

The "msg" field is any data of any data type, although the message's length is preferably limited by a constant known to the software.

On the switching module 16, there is preferably no prerequisite to calling LcomSendMessage 122, but on the resource processors another function, NewMessage, is called before LcomSendMessage. NewMessage allocates a queue link. This queue link is then added to the transmit queue when LcomSendMessage is called.

In the OFFLINE switching module 16 (in embodiments having redundant switching modules 16), the message is discarded and is not added to the transmit queue.

The type of message preferably determines which queue the message is placed in. On the resource processors 18,20, 22, if the message is a normal traffic message, it is placed in the queue that serves the primary bus 24. If it is an LCOM application message, the message is placed on either a primary or a secondary bus 24. On the switching module 16, if the message is a normal traffic message, the Heartbeat Table determines in which queue the message is placed. If it is an LCOM application message, the message may be placed on either of the buses.

On the resource processor boards 18,20,22, the queues are repeatedly checked for messages to be transmitted. If a message is ready, and the corresponding driver transmit buffer is ready, the message is taken off the queue and placed in the driver transmit buffer.

On the switching module 16, when a new message is added to a transmit queue, an event wakes up the LCOM task 124. Messages are taken from the transmit queues until the queues are empty. Each message waits for the appropriate transmit buffer to become available before it is placed in the driver transmit buffer.

For either the switching module 16 or any of the resource processors 18,20,22, once a message is placed into the driver transmit buffer, a first group of bytes, preferably thirty-two, are moved to the LCOM Controller's 56 transmit FIFO. This controller is shown on the signal-processing module block diagram, FIG. 5, but analogous controllers preferably exist on each of the switching modules 16 and resource processors 18, 20, 22 for interfacing with the redundant control buses 24.

When another group of bytes are transmitted by the LCOM controller 56, an interrupt is generated, and another group of bytes are moved to the LCOM Controller's 56 transmit FIFO. This continues until the entire message is sent. The message is preferably sent in constant-size groups of thirty-two in this embodiment. Even the last group is preferably the same size as the other groups. For this reason, the transmit buffer size of the LCOM driver is preferably divisible by the size of each group of bytes. If there is a transmission error and the error is recoverable, the buffer index is reset, the message is moved to the LCOM Controller's 56 transmit FIFO, and the transmission process is repeated.

As with transmission, messages are received by the LCOM Controller 56 in constant-size groups of bytes, so the receive buffer size of the driver is preferably divisible by thirty-two. As each block is received, an interrupt is generated, and the group of bytes are moved from the LCOM Controller 56 receive FIFO to the LCOM driver receive buffer. This continues until the entire message is received. Then the message is added to the receive queue. If there is a reception error, and the error is recoverable, the buffer index is reset, and reception occurs at the beginning of the message. If an error occurs which is not recoverable, this means that a message has been lost, and an error flag is set which eventually will cause an alarm.

On the resource processors 18,20,22, the receive queue is repeatedly checked for received messages. If one is available, it is taken from the queue and sent to a message distributor. The distributor routes the message based on only the process_id, which is the second byte of the LCOM_HEADER in this embodiment. The distributor uses the process_id to reference a table of function pointers. The referenced function is then called with the same parameters of LcomSendMessage 122. The following defines the interface of all resource processor message functions:

function (UINT1 processor, UINT1 process_id, UINT2 length, void FAR *msgλ).

On the switching module 16, when a new message is added to the receive queue, an event wakes up the LCMR task. Messages are taken from the receive queue until the queue is empty. Each message is copied to the appropriate operating system queue based on the process_id of the message.

The LCOM software also exists at the applications layer. The software at this level comprises the following functions: "hot" resource processor 18,20,22 board insertion detection; individual resource processor 18,20,22 bus failure detection and recovery; individual resource processor 18,20,22 failure detection (including "hot" resource processor 18,20,22 board removal detection); and OFFLINE switching module 16 bus failure detection. These functions are implemented with the following mechanisms: Primary Heartbeat Messaging; Secondary Heartbeat Messaging; and OFFLINE Heartbeat Response Reception.

Primary Heartbeat Messaging occurs on the primary bus 24 of each resource processor 18,20,22. In this embodiment, the primary bus 24 is the bus 24 on which the resource processor is currently transmitting application messages. All bus traffic except for Secondary Heartbeat Messaging occurs on the primary bus 24. The primary bus 24 of a resource processor 18,20,22 is determined only by its broadcast address. If its broadcast address is LCOM_BROADCAST_ADDRESS_A, then its primary bus is Bus A. If its broadcast address is LCOM_BROADCAST_ADDRESS_B, then its primary bus is Bus B.

The switching module 16 uses these broadcast addresses to broadcast heartbeat messages to either all boards with primary bus A or all boards with primary bus B. The primary bus 24 only has meaning for the resource processors 18,20,22; therefore, the switching module 16 does not have a primary bus. It transmits application messages on both buses 24. Primary heartbeat messaging is used to detect hot board insertion, primary bus failure, and board failure.

Secondary heartbeat messaging occurs on the secondary bus 24 of each resource processor 18,20,22. In this embodiment, the secondary bus 24 is the bus other than the primary bus 24. Secondary heartbeat messaging is used to detect secondary bus 24 failure.

OFFLINE heartbeat response reception is not active. The OFFLINE switching module 16 does not transmit on either the primary or secondary buses 24. The switching module 16 simply receives the same resource processor 18,20,22 responses that the ONLINE switching module 16 does. The OFFLINE heartbeat response reception is used to detect OFFLINE switching module 16 bus failure.

These functions and mechanisms are implemented with software on the resource processors 18,20,22 and the switching module 16. The switching module 16 application software consists of the LCOM heartbeat task (LCMH) and the Heartbeat_Table. The Heartbeat Table retains the state of each slot of the IOSS platform 27. Specifically, the Heartbeat_Table maintains status as to: whether each slot responds to a heartbeat poll; which bus 24 is used by each slot in its heartbeat response; and which bus 24 is the current transmission bus 24 for each slot.

The LCOM application software for the resource processors 18,20,22 consists of two message functions, which handle all LCOM heartbeat messages: Primary Heartbeat Messaging and Secondary Heartbeat Messaging.

Figure 7:
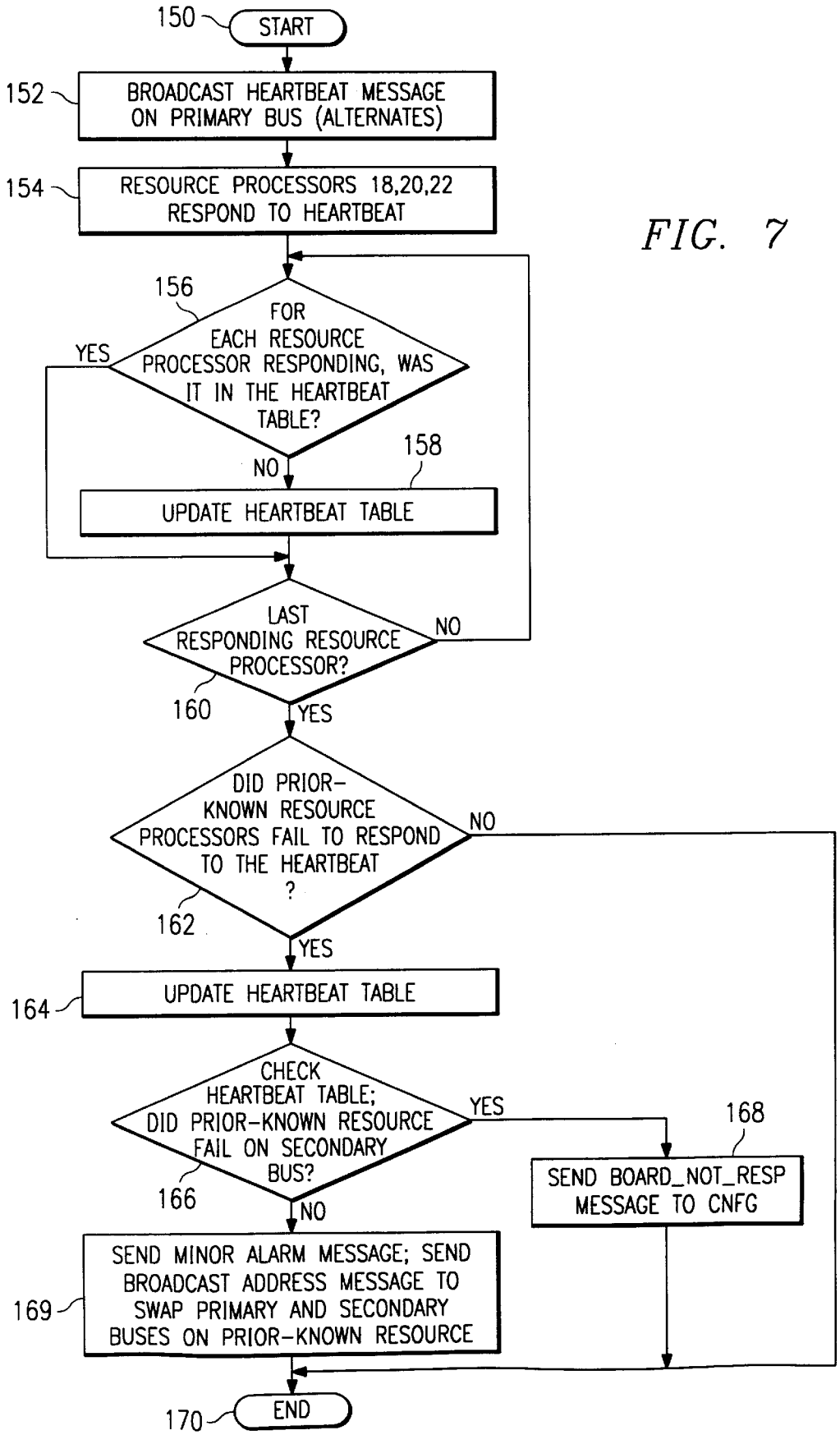
FIG. 7 is a flow diagram of Primary Heartbeat Messaging function.

Primary Heartbeat Messaging. Referring now to FIG. 7, Primary heartbeat messaging is the ONLINE switching module's mechanism for detecting and responding to hot insertions, hot removals, and primary LCOM bus 24 failures. "Hot" insertions and removals refer to insertions and removals that are performed when the switching platform 10 is powered-on and operating. A Heartbeat Table is provided on the switching module to monitor the status of the various resources in the telecommunications switching platform. The Heartbeat Table is kept at a lower applications level in the system than is the Configuration Table, and these tables are preferably separate. Other embodiments are, however, possible in the present invention; specifically, the status information could be maintained in real-time in the configuration table, and the below-mentioned updates to the Heartbeat Table could be made instead to the Configuration Table.

Periodically, at step 152, the switching module 16 broadcasts a heartbeat message on both control buses 24. Each resource processor 18,20,22 responds at step 154 to the broadcasted message received on its primary bus 24. For each resource processor 18,20,22 that responds to a primary heartbeat message, the Heartbeat Table is checked at step 156 to determine if the resource processor 18,20,22 was previously registered therein. This is done for each responding RP, as can be seen by decision block 160. If a newly inserted resource processor 18,20,22 responds to the broadcasted message, the switching module 16 registers this slot as a hot insertion at step 158. If an existing resource processor 18,20,22 fails to respond, at step 162, in the next heartbeat cycle the switching module 16 board tries transmitting a Heartbeat Message over the secondary bus 24 (at step 164). If the resource processor still fails to respond over the secondary bus 24, according to the test at step 166, then the switching module 16 registers either a hot removal or a board failure for that resource processor 18,20,22 at step 168. The switching module 16 makes this registration by removing the resource processor 18,20,22 from the Heartbeat Table and updating the Cnfg_Platform_Config_table.

Still referring to FIG. 7, more detailed embodiments will be discussed below. In one embodiment, at step 152, the LCMH task clears the response number and response bus fields of the Heartbeat Table and broadcasts the heartbeat message on both buses 24 in an alternating fashion. In other words, the LCMH will transmit a heartbeat message first over one of the buses (Bus A) and then will transmit a heartbeat message on the other bus (Bus B). Bus A may be a primary bus for some resource processors 18,20,22 and may be a secondary bus for the others. Bus B may be a primary bus for those buses for which Bus A was the secondary bus and may be a secondary bus for the others. The LCMH task sends the broadcast heartbeat message, which is preferably of the following format:

| PROCESSOR ID | PROCESS ID | LENGTH | BUS_ID |
|---|---|---|---|
| UINT1 Either BROAD-CAST_ADDR_A or BROAD-CAST_ADDR_B | UINT1 PID_LCOM_ HEART-BEAT | UINT2 0x0001 | UINT1 ESCC2_BUSA Or ESCC2_BUSB |

BROADCAST_ADDR_A is used for broadcasting to those resource processors 18,20,22 that have Bus A as their primary bus 24. BROADCAST_ADDR_B is used for broadcasting to those resource processors 18,20,22 that have bus B as their primary bus 24. The Bus_Id corresponds to the primary bus 24 of the resource processor 18,20,22.

Each resource processor 18,20,22 is preferably configured to receive a broadcast heartbeat message on its primary bus 24, so each resource processor 18,20,22 receives and responds at step 154 to only one of the broadcasted heartbeats. Upon reception, a message distributor within the resource processor 18,20,22 sends it to the PidCmnLcomHeartbeat message function. This message function performs actions depending on the resource processor 18,20,22 state and then responds at step 154 to the switching module 16 by sending a heartbeat response message on its primary bus 24. An exemplary format for the heartbeat response message is defined below:

| PROCESSOR ID | PROCESS ID | LENGTH | LCOM MESSAGE TYPE | SLOT ID | BUS_ID |
|---|---|---|---|---|---|
| UINT1 BID_SDM | UINT1 LCMH_ID | UINT2 0x0003 | UINT1 0x01 | UINT1 Slot ID of the resource processor 18, 20, 22 | UINT1 ESCC2_BUSA or ESCC2_BUSB |

The LCMH_ID is the process_id of the LCMH_ID task. The Bus_Id represents the primary bus 24 of the resource processor 18,20,22.

When the switching module 16 receives a heartbeat response message from a resource processor 18,20,22, it is distributed to the LCMH task, which at step 158 updates the Heartbeat Table for that particular resource processor 18,20,22. The Heartbeat Table is updated to indicate the new valid response count and the new bus 24 on which the response was received.

After one second has elapsed since the broadcast, the LCMH task updates the Heartbeat Table state fields based on the responses collected in the response number and response bus fields of the Heartbeat Table. The LCMH task then performs actions based on the state of each resource processor 18,20,22 in the Heartbeat Table.

The following sections describe how the heartbeat mechanism detects hot insertions, hot removals, and primary LCOM bus 24 failures.

Hot Insertions. The following method for detecting hot insertions accounts for the switching module 16 or the resource processor 18,20,22 powering up first, and allows for new resource processors 18,20,22 to attempt connection on both buses 24 in case the board has only one good bus 24. Also, this method eliminates the need for CNFG task to ping all slots at startup. The CNFG task is described in greater detail in U.S. patent application Ser. No. 09/026,486 (Docket No. 24194000.196), entitled "System and Method for Forming Circuit Connections within a Telecommunications Switching Platform," which was filed on Feb. 19, 1998 and is hereby incorporated by reference herein.

When a resource processor 18,20,22 has finished booting and initializing, it goes into registration mode. In an attempt to balance the message load, the board initially sets its broadcast address and primary bus 24 based on its slot number. In one embodiment, if a resource processor 18,20,22 is located on a telecommunications rack slot having an odd slot number, its initial primary bus 24 will be Bus B. If it is in a slot having an even slot number, its initial primary bus 24 will be Bus A. This helps in load sharing and reducing the number of collisions on the control buses 24.

Although the buses 24 are preferably wired-OR buses, upon which collisions are possible, the buses 24 may be other types of buses or the resource processors 18,20,22 might be connected to each other using local area network connections. In any case, even if collisions cannot happen on the buses 24, the load-sharing by division of resource processors 18,20,22 between two communications media is still advantageous in balancing the traffic load therebetween.

The switching module 16 receives the heartbeat response, and after one second has elapsed since sending the heartbeat message, updates the Heartbeat Table to indicate that the new board is ON-LINE. And then sends a PID_CHANGE_BROADCAST_ADDR message to the resource processor 18,20,22 (note this message is mainly used to swap broadcast addresses). The PID_CHANGE_BROADCAST_ADDR message has the following format:

| PROCESSOR ID | PROCESS ID | LENGTH | BUS_ID |
|---|---|---|---|
| UINT1 Slot ID of the resource processor 18, 20, 22 | UINT1 PID_CHANGE_BROADCAST_ADDR | UINT2 0x0001 | UINT1 either ESCC2_BUSA or ESCC2_BUSB |

When the resource processor 18,20,22 receives the PID_CHANGE_BROADCAST_ADDR message, it leaves registration mode, and goes into normal operation mode. The resource processor 18,20,22 is then able to transmit all messages.

If the resource processor 18,20,22 does not receive a heartbeat message from the switching module 16, the transmission bus 24 and broadcast address are changed to the other bus 24. If there is no heartbeat message within a second time period, the transmission bus 24 and broadcast address are changed back to the original bus 24, and so on. This bus switching allows the resource processor 18,20,22 to attempt connection on both buses 24 in case one is bad.

Bus and Board Failure Detection. The following bus failure detection method detects individual resource processor 18,20,22 primary bus 24 failure within one time period and individual resource processor 18,20,22 failure within two time periods. A time period is preferably one second, but of course, these time periods can be shortened to any desired time period by increasing the rate of the heartbeat messages from the switching module 16. In one embodiment, the LCOM protocol only assumes board failure, but cannot determine between resource processor board 18,20,22 failure and hot removal.

Thus, when a resource processor 18,20,22 stops responding on both buses according to the test at step 16, LCOM sends CNFG a BOARD_NOT_RESP message at step 168. CNFG must determine if a board has failed or has been removed based on the ONLINE or OFFLINE state of the resource processor 18,20,22.

If the switching module 16 receives responses from all existing resource processors 18,20,22 within a first period, it proceeds assuming that all is well at step 170. But if the switching module 16 does not receive a response from an already-existing resource processor 18,20,22, the switching module 16 assumes that, at the least, that the unresponsive resource processor 18,20,22 has a bad transmit or receive bus driver of its primary bus 24. The Heartbeat Table is updated accordingly at step 164. If the secondary bus 24 is also known bad, a BOARD_NOT_RESP is sent to CNFG at step 168 since no communication with the resource processor 18,20,22 is possible. If the secondary bus 24 is known to be good, the process proceeds to step 169. At step 169, a minor alarm message is sent to the CNFG task on the switching module 16.

Also at step 169, a set broadcast address message is sent from the switching module 16 to the unresponsive resource processor 18,20,22 on the secondary bus 24 so that resource processor is communicated with over its secondary bus 24.

If the resource processor 18,20,22 receives the set broadcast address command, the Change Broadcast Address message function will set the broadcast address according to the Bus_Id field of the message. This also swaps the primary and secondary bus 24 (and queue) so that the new primary bus 24 is the old secondary bus 24, and the new secondary bus 24 is the old primary bus 24. This will allow the resource processor 18,20,22 to receive and respond to heartbeats on the known good bus 24.

In cases when the resource processor 18,20,22 is not able to respond to heartbeat messages within the prescribed heartbeat period, preferably one second, the LcomStopResponding function is called. This puts the resource processor 18,20,22 back in registration mode, and sends an LCOM stop responding message to the switching module 16. This tells the switching module 16 to ignore any unresponsiveness of a board. In other words, if the switching module 16 does not get a heartbeat response from the resource processor 18,20,22, no alarms are sent to the CNFG task. The LCOM stop responding message has the following format:

| PROCESSOR ID | PROCESS ID | LENGTH | LCOM MESSAGE TYPE | SLOT ID |
|---|---|---|---|---|
| UINT1 BID_SDM | UINT1 LCMH_ID | UINT2 0x0003 | UINT1 0x02 | UINT1 Slot ID of the resource processor 18, 20, 22 |

Once the unresponsive state has been reached, the switching module 16 behaves as if the resource processor 18,20,22 is not present. Then, when the resource processor 18,20,22 receives and processes an LCOM heartbeat, the resource processor and the switching module 16 behave as if the resource processor 18,20,22 was a hot insertion.

Figure 8:
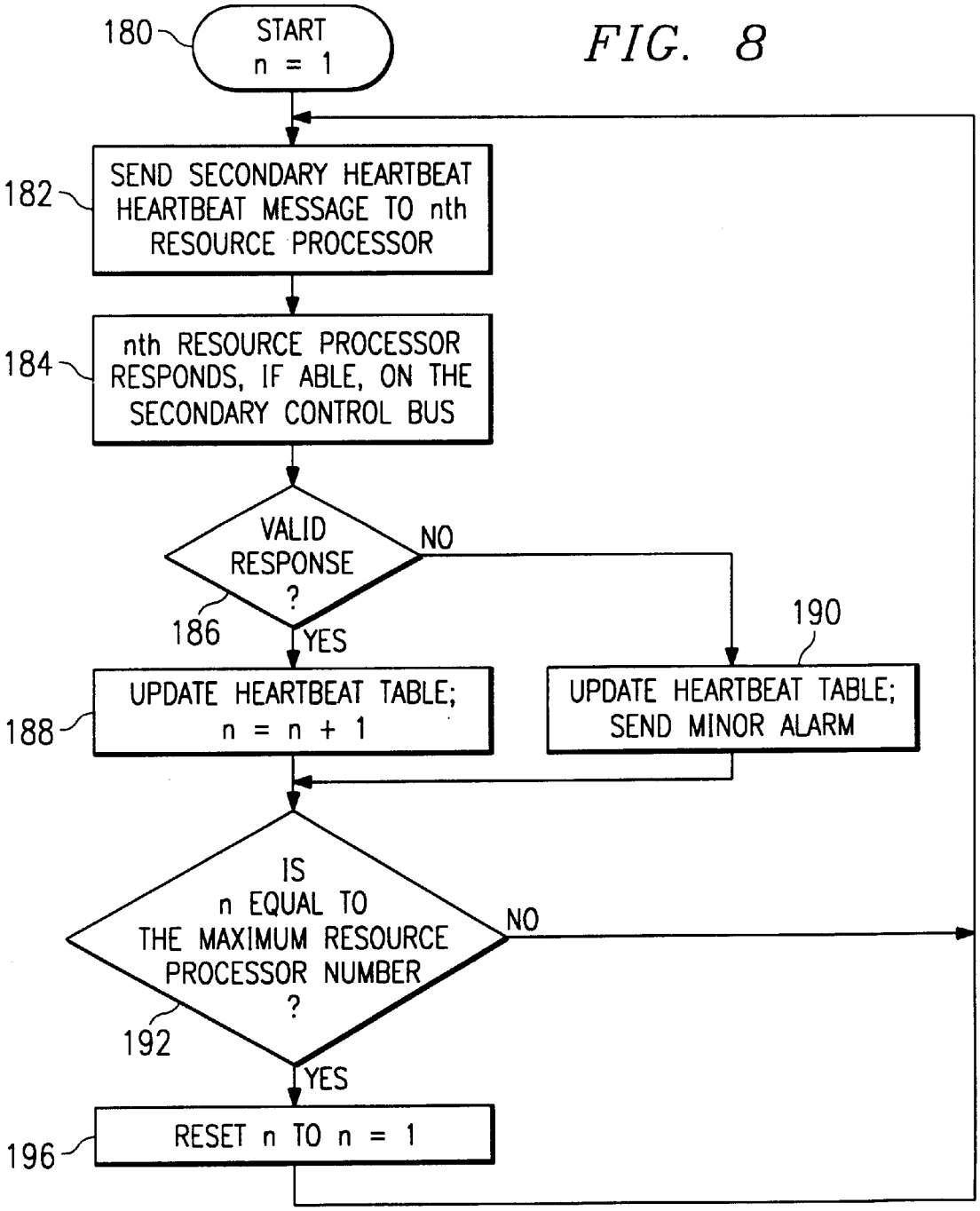
FIG. 8 is a flow diagram of the Secondary Heartbeat Messaging function.

Secondary Heartbeat Messaging. Referring now to FIG. 8, secondary heartbeat messaging is the ONLINE switching module 16 mechanism for detecting a bad secondary bus 24 on a resource processor 18,20,22. This mechanism is important so CNFG can be warned that the secondary bus 24 is bad, so no attempt is made to use this as a primary bus 24. Instead, an operator can then force the suspect board into OFFLINE mode and replace it with another without losing any messages. The secondary bus 24 failure method detects bus failure of secondary buses 24, preferably within twenty heartbeat periods in an embodiment where twenty resource processors 18,20,22 exist on the IOSS platform 27.

During each heartbeat period, the switching module 16 sends a secondary heartbeat message at step 182. This heartbeat message is in addition to the primary heartbeat message, but it is only addressed for one registered resource processor 18,20,22. In one embodiment, the secondary heartbeat message is always sent on the secondary bus 24. Preferably, the secondary heartbeat message has the same format as the primary heartbeat message, which was described above.

At step 184, the resource processor 18,20,22 responds to the secondary heartbeat message the same way it responds to a primary heartbeat message, but it responds on the secondary bus 24. In this embodiment, this is the only message that is sent on the secondary bus 24 from a resource processor 18,20,22. The format of the secondary heartbeat response message is preferably the same as the format of the primary heartbeat response described above.

The switching module 16 preferably responds to the secondary heartbeat response message the same way it responds to a primary heartbeat response message. When the switching module 16 receives a valid heartbeat response message from a resource processor 18,20,22 according to the test step 186, it is distributed to the LCMH task, which updates the Heartbeat Table. The Heartbeat Table is updated at step 188 to indicate the new valid response count and the new bus 24 on which the response was received.

If, after the heartbeat period elapses, the switching module 16 does not receive a response from the resource processor 18,20,22, it is assumed that the unresponsive resource processor 18,20,22 has, at the least, either bad transmit or receive bus 24 driver on its secondary bus 24. Then, at step 190, the Heartbeat Table is updated accordingly and a minor alarm message is sent to CNFG, since communication with the resource processor 18,20,22 is still possible on the primary bus 24.

According to step 192, each period, a different registered resource processor 18,20,22 is addressed until they all have been addressed. When a secondary heartbeat message has been sent to all registered boards, the cycle starts over.

OFFLINE Heartbeat Response Reception. OFFLINE heartbeat response reception is the OFFLINE switching module 16 mechanism for detecting a bad bus 24 on the OFFLINE switching module 16. This mechanism is important so the CNFG task can be warned that a OFFLINE switching module 16 bus is bad, so it will never attempt to use it. The switching module 16 board can then be replaced by an operator without losing any messages. OFFLINE heartbeat response reception allows detection of OFFLINE switching module 16 bus error, preferably within twenty seconds. The OFFLINE Heartbeat Response Reception is also a passive mechanism. No messages are sent to resource processors 18,20,22 from the OFFLINE switching module 16. Instead, the OFFLINE switching module 16 utilizes the resource processors 18,20,22 responses to the ONLINE switching module 16 to determine bus status.

Preferably, within twenty heartbeat periods, the OFFLINE switching module 16 should receive twenty complete sets of primary heartbeat response messages and one or more sets of secondary heartbeat response messages. When the OFFLINE switching module 16 receives a heartbeat response, it is distributed to the LCMH task, which updates the Heartbeat Table.

After the preferred twenty heartbeat periods, the Heartbeat Table is checked. If the table indicates at least one reception of a heartbeat response on bus A and bus B, all is well. The OFFLINE heartbeat response reception begins another cycle, but if the table indicates no receptions on a particular bus 24, then that bus is assumed bad. A warning alarm is sent to the CNFG task to inform it of the bad bus 24.

Heartbeat Table Operation; ONLINE Switching Module 16 Operation. When the switching module 16 becomes ONLINE, if either bus 24 is known bad, the switching module 16 will send a set broadcast address message to all boards using the good bus 24. The set broadcast address message is defined above. This ensures that each resource processor 18,20,22 uses the only good bus as its primary bus 24.

Next all response number fields of the Heartbeat Table are initialized to LCOM_NO_CARD. As responses start coming in, the state will change to indicate the primary bus 24 of each board.

After initialization, the LCMH task periodically resets the Heartbeat Table response number fields to zero and the Heartbeat Table response bus fields to ESCC2_NO_BUS for each resource processor 18,20,22. When a valid heartbeat response message is received from a resource processor 18,20,22, the Heartbeat Table response number field for that board is incremented, indicating a valid reception. The Heartbeat Table bus response field is also updated according to the bus 24 on which the heartbeat response message is received.

The Heartbeat Table state field is updated according to the values of the Heartbeat Table response number and response bus fields.

The Heartbeat State Table holds the heart beat state value for each slot of the system. There are dynamic states which are transient states having a duration of one period and there are static states changing only upon certain events. The following lists possible static and dynamic heartbeat states and descriptions:

| STATIC HEARTBEAT STATE | DESCRIPTION |
|---|---|
| LCOM_FIRST_A | A is primary bus, B is good |
| LCOM_FIRST_B | B is primary bus, A is good |
| LCOM_SECOND_A_P | A is primary bus, B is bad due to primary bus failure |
| LCOM_SECOND_B_P | B is primary bus, A is bad due to primary bus failure |

-continued

| | |
|---|---|
| LCOM_SECOND_A_S | A is primary bus, B is bad due to secondary bus failure |
| LCOM_SECOND_B_S | B is primary bus, A is bad due to secondary bus failure |
| LCOM_NO_CARD | No card is connected in this slot (Initialized to this at boot) |

| DYNAMIC HEARTBEAT STATE | DESCRIPTION |
|---|---|
| LCOM_GOTO_SECOND_A_P | A becomes primary bus because no response on previous primary bus B. Sends Alarm |
| LCOM_GOTO_SECOND_B_P | B becomes primary bus because no response on previous primary bus A. Sends Alarm |
| LCOM_GOTO_SECOND_A_S | A remains primary bus, but detected secondary bus failure on B. Sends Alarm. |
| LCOM_GOTO_SECOND_B_S | B remains primary bus, but detected secondary bus failure on A. Sends Alarm |
| LCOM_GOTO_FIRST_A_P | A remains primary bus, but bus B which previously had a bus A primary failure is now working. Send clear Alarm |
| LCOM_GOTO_FIRST_B_P | B remains primary bus, but bus A which previously had a bus A primary failure is now working. Send clear Alarm |
| LCOM_GOTO_FIRST_A_S | A remains primary bus, but bus A which previously had a bus B secondary failure is now working. Send clear Alarm |
| LCOM_GOTO_FIRST_B_S | A remains primary bus, but bus A which previously had a bus B secondary failure is now working. Send clear Alarm |
| LCOM_FAILING | Failing because of no response on A or B. Sends BOARD_NOT_RESP. |
| LCOM_GOTO_FIRST | Received first response from card since boot |

Each slot of the Heartbeat Table state field is preferably updated every heartbeat period. The following events within the heartbeat period induce a change: reception of a Primary Heartbeat Response Message; reception of a Secondary Heartbeat Response Message; no reception of Primary Heartbeat Response Message; and no reception of a Secondary Heartbeat Response Message.

The following state table shows the next state that results from an event occurring during the current state.

| CURRENT STATE | PRIMARY HEARTBEAT RECEPTION | NO PRIMARY HEARTBEAT RECEPTION | SECONDARY HEARTBEAT RECEPTION | NO SECONDARY HEARTBEAT RECEPTION |
|---|---|---|---|---|
| FIRST_A | FIRST_A | GOTO_SECOND_B_P | FIRST_A | GOTO_SECOND_A_S |
| FIRST_B | FIRST_B | GOTO_SECOND_A_P | FIRST_B | GOTO_SECOND_B_S |
| SECOND_A_P | SECOND_A_P | FAILING | GOTO_FIRST_A_P | SECOND_A_P |
| SECOND_B_P | SECOND_B_P | FAILING | GOTO_FIRST_B_P | SECOND_B_P |
| SECOND_A_S | SECOND_A_S | FAILING | GOTO_FIRST_A_S | SECOND_A_S |
| SECOND_B_S | SECOND_B_S | FAILING | GOTO_FIRST_B_S | SECOND_B_S |
| NO_CARD | GOTO_FIRST | NO_CARD | NO_CARD | NO_CARD |

The following states cause the following responses, and preferably immediately advance to another state:

| CURRENT STATE | RESPONSE | NEXT STATE |
|---|---|---|
| GOTO_SECOND_B_P | Send an alarm to CNFG that bus A has a primary failure, and send a set broadcast address message to the resource processor 18, 20, 22. | SECOND_B_P |
| GOTO_SECOND_A_P | Send an alarm to CNFG that bus B has a primary failure, and send a set broadcast address message to the resource processor 18, 20, 22. | SECOND_A_P |
| GOTO_SECOND_B_S | Send an alarm to CNFG that bus A has a secondary failure. | SECOND_B_S |
| GOTO_SECOND_A_P | Send an alarm to CNFG that bus B has a secondary failure. | SECOND_A_S |
| GOTO_FIRST_B_P | Send an alarm clear to CNFG that bus A has a primary failure. | FIRST_B |
| GOTO_FIRST_A_P | Send an alarm clear to CNFG that bus B has a primary failure. | FIRST_A |
| GOTO_FIRST_B_S | Send an alarm clear to CNFG that bus A has a secondary failure. | FIRST_B |
| GOTO_FIRST_A_S | Send an alarm clear to CNFG that bus B has a secondary failure. | FIRST_A |
| FAILING | Send BOARD_NOT_RESP to CNFG that resource processor 18, 20, 22. | NO_CARD |
| GOTO_FIRST | Send a set broadcast address message to the resource processor 18, 20, 22. The new address corresponds to the bus in Heartbeat Table. | FIRST_A or FIRST_B |

Heartbeat Table Operation; OFFLINE Switching Module 16 Operation. After a period, preferably every twenty seconds, the LCMH task resets the OFFLINE switching module 16 fields of the Heartbeat Table. The Heartbeat Table response number field is set to 0, and the Heartbeat Table response bus field is set to ESCC2_NO_BUS. Then, within preferably twenty periods, when a valid primary or secondary heartbeat response message has not been received from a resource processor 18,20,22 and the Bus_Id of the response does not match the previous Bus_Id, the Heartbeat Table is updated to indicate the new valid response count and the new bus 24 on which the response was received.

Again, after a period, the OFFLINE switching module 16 slot of the Heartbeat Table is updated based on the Heartbeat Table response number and response bus fields. If a bus 24 fails, an alarm is sent to the CNFG task. If both buses 24 fail, a BOARD_NOT_RESP message is sent to the CNFG task. The following shows the state of this entry based on the responses indicated by the latter tables:

| RESPONSES RECEIVED | STATE |
|---|---|
| Responses on bus A and B | LCOM_OFF_NO_FAIL |
| Response on bus A only | LCOM_OFF_B_FAIL |
| Response on bus B only | LCOM_OFF_A_FAIL |
| No response | LCOM_OFF_ALL_FAIL |

Also, for each bus 24 with no response, an alarm message is sent to the CNFG task, warning it of existing bad OFFLINE switching module buses.

CNFG interfaces. The LCOM application interfaces with the CNFG task through alarm and board_not_responding messages.

When a resource processor 18,20,22 is not responding on bus A or bus B, LCOM send CNFG a BOARD_NOT_RESP message of the following format:

```
typedef struct
{
MSG_HEADER hdr;
BOARD_NOT_RESP_BODY_T body
} BOARD_NOT_RESP_T;
typedef struct
{
  UINT2 slot;
} BOARD_NOT_RESP_BODY_T.
```

When a bus failure occurs, CNFG is notified through an alarm message. For switching module 16 OFFLINE bus failures, LCOM uses the Report_Alarm function to send the message:

Report_Alarm(UINT2 base_alarm, UINT1 report_status)/.

The following table describes each OFFLINE switching module 16 LCOM base_alarm:

| BASE ALARM | DESCRIPTION |
|---|---|
| ALM_SDM_LCOM_BUS_A_FAIL | Bus A failed on the switching module 16 OFFLINE board |
| ALM_SDM_LCOM_BUS_B_FAIL | Bus B failed on the switching module 16 OFFLINE board |

For resource processor 18,20,22 bus failures, LCOM uses the Report_Remote_Alarm function to send the message (lci is always INVALID_LCI):

Report_Remote_Alarm(UINT2 base_alarm, UINT1 report_status, UINT1 slot, UINT4 lci)/.

The following table describes a number of exemplary LCOM base alarms:

| BASE | DESCRIPTION |
|---|---|
| ALM_CMN_LCOM_ILLEGAL_PROC_ID | A message with an invalid process id was received by a resource processor 18, 20, 22. |
| ALM_CMN_LCOM_PRIMARY_BUS_A_FAIL | The switching module 16 failed to receive a primary heartbeat response from a resource processor 18, 20, 22 on bus A. |
| ALM_CMN_LCOM_PRIMARY_BUS_B_FAIL | The switching module 16 failed to receive a primary heartbeat response from a resource processor 18, 20, 22 on bus B. |
| ALM_CMN_LCOM_SECONDARY_BUS_A_FAIL | The switching module 16 failed to receive a secondary heartbeat response from a resource processor 18, 20, 22 on bus A. |

There are also some common alarms that can occur on the switching module 16 and the resource processors 18,20,22:

| COMMON BASE ALARM | DESCRIPTION |
|---|---|
| ALM_DMN_LCOM_XMIT_BUF_TIMEOUT | A message transmission timeout occurred. |
| ALM_CMN_LCOM_INIT_MEM_FAIL | Unable to initialize the memory for the LCOM receive and transmit queues. |
| ALM_CMN_LCOM ILLEGAL_HB_STATE | Illegal LCOM state |
| ALM_CMN_LCOM_ | A message was lost on bus A probably |

-continued

| COMMON BASE ALARM | DESCRIPTION |
|---|---|
| INT_MSG_LOSS_A | due to receive data overrun. |
| ALM_CMN_LCOM_ INT_MSG_LOSS_B | A message was lost on bus B probably due to receive data overrun. |
| ALM_CMN_LCOM_ INT_NO_MSG_BUF | A message was lost due to lack of message storage buffers. |
| ALM_CMN_LCOM_ INVALID_MSG_LENGTH | An attempt to send a message that exceeds the maximum length allowed. |

Described above are a system and method for providing rate-adaption and transcoding functions in a telecommunications switching platform. More specifically described are a system and method for transcoding and rate-adapting between information channels having a first rate and signal-encoding scheme and information channels having a second rate and second signal-encoding scheme. Further described are a system and method for determining when a signal-processing module has failed or been removed or inserted into an operating telecommunications switching platform. Also described is a system and method for efficient power-up, in which the signal-processing modules have their operating systems stored in a nonvolatile memory that can be reprogrammed without removing it from the system.

The preferred embodiment signal-processing module is further capable of responding to heartbeat messages and identifying itself as operational over one bus or both buses of a redundant-pair control bus. The module also has a reprogrammable, nonvolatile memory associated with from which it can run its operating system. The module can also transfer the operating system into another memory, allowing it to make updates to the operating system stored in the nonvolatile memory without interrupting its execution of its run-time operating code.

A few preferred embodiments have been described in detail hereinabove. It is to be understood that the scope of the invention also comprehends embodiments different from those described, yet within the scope of the claims.

For example, the terms "controller," "processing circuitry," and "control circuitry" comprehend ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAN (static random access memory), DRAM (dynamic random access memory), pseudo-static RAM, latches, EEPROM (electrically-erasable programmable read-only memory), EPROM (erasable programmable read-only memory), Flash memory, registers, or other memory devices known in the art. Words of inclusion are to be interpreted as nonexhaustive in considering the scope of the invention.

Aspects of the claimed invention may be applied to switching systems for GSM mobile switches, PCS mobile switches, or in switches primarily used for switching land-based circuits. The telecommunications circuits described in the preferred embodiment were generally E1 or T1 spans, but aspects of the invention could be applied to platforms that switch lower- or higher-bandwidth circuits such as T-2, T-3, or SONET. Also, aspects of the invention could be applied to switch circuits of bandwidths generally equivalent to E1 or T1 but having different framing formats.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A signal-processing module for use in a telecommunications switching platform, said telecommunications switching platform operable to receive from a transmit traffic channels at a first data rate and receive from and transmit to traffic channels at a second data rate, said signal-processing module comprising:

a bus interface operable to receive from and transmit to a data signal carrying at least one of said traffic channels at said first data rate and at least one of said traffic channels at said second data rate; and a processor connected to said bus interface, said processor operable to rate-adapt between said at least one first data rate traffic channel and said at least one second data rate traffic channel, whereby said first data rate traffic channel and said second data rate traffic channel are logically connected to form a single mixed-rate traffic channel operating at a first data rate at one end of said traffic channel and a second data rate at a second end of said traffic channel.

2. The signal-processing module of claim 1 wherein said at least one of said traffic channels at said first data rate is carrying LPC-encoded speech data and said at least one of said traffic channels at said second data rate is carrying PCM-encoded data, and wherein said processor, in addition to being operable to rate-adapt between said first and second data rates, is further operable to transcode between said LPC-encoded speech data and said PCM-encoded speech data.

3. The signal-processing module of claim 1 wherein said data signal carries a plurality of traffic channels at said first data rate and a plurality of traffic channels at said second data rate, and wherein said processor is operable to rate-adapt between said first data rate traffic channels and said second data rate traffic channels, thereby forming a plurality of mixed-rate traffic channels operating at said first data rate at one end and at a second data rate at a second end of each of said plurality of traffic channels.

4. The signal-processing module of claim 3 wherein said processor is a plurality of digital signal processors and wherein said signal-processing module further comprises a multiplexer operable to receive said data signal carrying said plurality of first data rate traffic channels and said second data rate traffic channels and to direct one subset of said plurality of first and second data rate traffic channels to one of said plurality of digital signal processors and a second subset of said first and second data rate traffic signals to another of said plurality of digital signal processors.

5. The signal-processing module of claim 4 wherein said digital signal processors are mounted on daughter boards and wherein said daughter boards are mounted on a mother board along with said multiplexer.

6. The signal-processing module of claim 4 wherein each of said Digital Signal Processors are operable to rate-adapt between a plurality of first data rate traffic channels and second data rate traffic channels.

7. The signal-processing module of claim 3 wherein said processor is further operable to transcode between a plurality of LPC-encoded traffic channels at said first data rate and a plurality of PCM-encoded traffic channels at said second data rate, whereby said plurality of mixed-rate traffic channels also are mixed-coding traffic channels, LPC-encoded at said first end and PCM-encoded at said second end.

8. The signal-processing module of claim 1 wherein said signal-processing module is operable to communicate with other elements in said telecommunications switching platform through a bus and wherein said telecommunications switching platform is further operable to send primary heartbeat messages over said local bus, said signal-processing module further comprising:

a local bus interface connected to said local bus; and a local communications controller connected to said local bus interface and operable to receive said heartbeat messages and send primary heartbeat response to at least one of said primary heartbeat messages, whereby said telecommunications switching platform can determine whether said signal-processing module is operational.

9. The signal-processing module of claim 8 wherein said primary heartbeat of response comprises a header sufficient to identify said signal-processing module.

10. The signal-processing module of claim 8 wherein said local bus is a redundant control bus having a primary control bus and a secondary control bus and wherein said local bus interface is connected to both said primary control bus and said secondary control bus and wherein said primary control bus is operable to carry said primary heartbeat messages and said primary heartbeat responses and wherein said secondary control bus is operable to carry secondary heartbeat messages and wherein said local communications controller is operable to send secondary heartbeat responses to said secondary heartbeat messages over said secondary control bus via said interface controller.

11. The signal-processing module of claim 1 and further comprising:

a controller connected to said processor, said controller operable to supervise the operation of the signal-processing module in providing the functions for which it is responsible;

a nonvolatile memory connected to said controller, said nonvolatile memory having operating instructions for said controller; and a memory connected to said controller whereby said controller can operate from instructions stored in said memory without reference to said nonvolatile memory.

12. The signal-processing module of claim 11 wherein said controller is further operable to transfer said operating instructions from said nonvolatile memory to said memory.

13. The signal-processing module of claim 12 wherein said controller is further operable to download new operating instructions from other elements in the telecommunications switching platform.

14. The signal-processing module of claim 13 wherein said controller is further operable to load said new operating instructions into said nonvolatile memory thereby reprogramming said nonvolatile memory such that said new operating instructions will be fixedly stored in said nonvolatile memory until said nonvolatile memory is again reprogrammed.

15. The signal-processing module of claim 14 wherein said controller is further operable to load said new operating instructions into said memory.

16. A signal-processing module for use in a telecommunications switching platform for switching information channels borne on telecommunications signals connected to telecommunications switching platform, said signal-processing module comprising:

a control bus interface connected to a control bus within said telecommunications switching platform;

a controller connected to said control bus interface, said controller operable to communicate with other elements in said telecommunications switching platform through said control bus interface, said controller further operable to receive a primary heartbeat message as a part of said communication with said other elements and to transmit a primary heartbeat response upon receipt of said primary heartbeat message.

17. The signal-processing module of claim 16 wherein said signal-processing module comprises at least one circuit operable to perform a signal-processing function.

18. The signal-processing module of claim 17 wherein said signal-processing function is a function selected from the group consisting of transcoding and rate adaption.

19. The signal-processing module of claim 17 wherein said circuit is a digital signal processor.

20. The signal-processing module of claim 16 wherein said primary heartbeat response includes data sufficient to identify said signal-processing module such that said telecommunications switching platform can compare said data to a table of known resources to determine whether the existence of said signal-processing module had previously been detected by said telecommunications switching platform.

21. The signal-processing module of claim 16 wherein said control bus is a pair of redundant control buses comprising a primary control bus and a secondary control bus.

22. The signal-processing module of claim 21 wherein said signal-processing module is further operable to receive through said control bus interface a secondary heartbeat message, which is received by said control bus interface from said secondary control bus.

23. The signal-processing module of claim 22 wherein said signal-processing module is one of a plurality of resources in the telecommunications switching platform, and wherein a first group of said plurality of resources is operable to use one of the redundant control buses as a primary bus and a second group of said plurality of resources is operable to use the other of the redundant control buses as a primary bus, and wherein said signal-processing module is operable to determine which of said primary heartbeat messages are intended for said signal-processing module.

24. The signal-processing module of claim 23 wherein said control bus interface is operable to determine within said signal-processing module which of said primary heartbeat messages are intended for the group to which said signal-processing module belongs.

25. The signal-processing module of claim 24 wherein said controller is operable to determine within said signal-processing module which of said primary heartbeat messages are intended for the group to which said signal-processing module belongs.

26. The signal-processing module of claim 22 wherein said secondary heartbeat message is addressed to only one signal-processing module.

27. The signal-processing module of claim 26 wherein said control bus interface is operable to determine whether said secondary heartbeat message is addressed to said signal-processing module.

28. The signal-processing module of claim 26 wherein said controller is operable to determine whether said secondary heartbeat message is addressed to said signal-processing module.

29. A signal-processing module for use in a telecommunications switching platform for switching information channels borne on telecommunications signals connected to said telecommunications switching platform, said signal-processing module comprising:

a control bus interface connected to a redundant pair of control buses within said telecommunications switching platform, said redundant pair of control buses comprising a primary control bus and a secondary control bus; and a module controller connected to said control bus interface, said module controller operable to communicate with other elements in said telecommunications switching platform through said control bus interface, said module controller further operable: to receive a primary heartbeat message, which was received by said control bus interface from said primary control bus; to transmit a primary heartbeat response upon receipt of said primary heartbeat message; to receive a secondary heartbeat message, which was received by said control bus interface from said secondary control bus; and to transmit a secondary heartbeat response upon receipt of said secondary heartbeat message.

30. The signal-processing module of claim 29 wherein each of said primary heartbeat response and said secondary heartbeat response is sufficient to identify said telephony-module such that said telecommunications switching platform can compare said data to a table of known resources to determine whether the existence of said signal-processing module had previously been detected by said telecommunications switching platform.

31. The signal-processing module of claim 29 wherein said signal-processing module comprises at least one circuit operable to perform a signal-processing function.

32. The signal-processing module of claim 31 wherein said signal-processing function is a function selected from the group consisting of transcoding and rate adaption.

33. The signal-processing module of claim 31 wherein said circuit is a digital signal processor.

34. A signal-processing module for use in a telecommunications switching platform for switching information channels borne on telecommunications signals connected to said signal-processing module, said signal-processing module comprising:

a nonvolatile memory;

another memory;

a local communications controller operable to communicate with other elements in said telecommunications switching platform through a control bus; and a module controller connected to said nonvolatile memory, said another memory, and said local communications controller, said module controller operable to control the operation of said signal-processing module, said module controller further operable: to perform operations according to instructions stored in said nonvolatile memory; to effect the transfer of instructions from said nonvolatile memory to said another memory; to perform other operations according to instructions stored in said another memory; and to effect the loading of new operating instructions from the telecommunication switching platform's higher-level applications into said nonvolatile memory through said local communications controller.

35. The signal-processing module of claim 34 wherein said signal-processing module comprises at least one circuit operable to perform a signal-processing function.

36. The signal-processing module of claim 35 wherein said signal-processing function is a function selected from the group consisting of transcoding and rate adaption.

37. The signal-processing module of claim 35 wherein said circuit is a digital signal processor.

38. The signal-processing module of claim 34 wherein said module controller is operable to effect said loading of new operating instructions at substantially the same time as said module controller is performing said other operations according to instructions stored in said another memory.

39. The signal-processing module of claim 38 wherein said module controller is operable to effect said loading of new operating instructions substantially without interruption of its operation according to instruction stored in said another memory.

40. The switching module of claim 39 wherein said new operating instructions are downloaded from higher-level elements in the telecommunications switching platform and wherein said operating instructions are uniquely identified by the format of the download of said operating instructions.

41. The switching module of claim 40 wherein said download of said operating instructions includes a header identifying the module and process within the telecommunications switching platform on which said operating instructions are to run.

42. A signal-processing module for use in a telecommunications switching platform, said telecommunications switching platform operable to receive from a transmit traffic channels at a first data rate and receive from and transmit to traffic channels at a second data rate, said signal-processing module comprising:

a bus interface operable to receive from and transmit to a data signal carrying at least one of said traffic channels at said first data rate and at least one of said traffic channels at said second data rate;

a processor connected to said bus interface, said processor operable to rate-adapt between said at least one first data rate traffic channel and said at least one second data rate traffic channel, whereby said first data rate traffic channel and said second data rate traffic channel are logically connected to form a single mixed-rate traffic channel operating at a first data rate at one end of said traffic channel and a second data rate at a second end of said traffic channel; and a controller for supervision of said signal-processing module, said controller operable to initiate a heartbeat message to said processor and to receive a heartbeat response from said processor.

43. The signal-processing module of claim 42 wherein said processor is further operable to detect when said processor has failed to respond within a determinate period.

44. The signal processing module of claim 43 wherein said processor is further operable to notify another element within the telecommunications switching platform of said processor's failure to response.

45. The signal processing module of claim 44 wherein said telecommunications switching platform is operable to remap information channels being handled by said telecommunications switching platform so that a different processor can take over the task being handled by the non-operational processor.

46. The signal-processing module of claim 4 wherein said processor is mounted on a daughter board removably connected to said signal-processing module.

* * * * *